(12) United States Patent
Watson et al.

(10) Patent No.: US 7,741,744 B2
(45) Date of Patent: Jun. 22, 2010

(54) SYSTEM AND METHOD FOR PROTECTING A SUBMERSIBLE MOTOR

(75) Inventors: Arthur I. Watson, Sugar Land, TX (US); Michael H. Du, Pearland, TX (US); John D. Rowatt, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1114 days.

(21) Appl. No.: 11/308,447

(22) Filed: Mar. 27, 2006

(65) Prior Publication Data
US 2007/0224056 A1 Sep. 27, 2007

(51) Int. Cl.
*H02K 5/132* (2006.01)
*H02K 5/10* (2006.01)

(52) U.S. Cl. ............ 310/87; 310/89; 166/68; 166/108; 417/414

(58) Field of Classification Search ........ 310/85, 310/87, 89; 166/68, 105, 108, 156, 256, 166/387; 417/414
See application file for complete search history.

(56) References Cited

U.S. PATENT DOCUMENTS

| | | | |
|---|---|---|---|
| 2,218,937 A * | 10/1940 | Myers et al. ............ 310/87 |
| 3,953,213 A * | 4/1976 | Gasper ............... 277/438 |
| 4,421,999 A | 12/1983 | Beavers et al. |
| 4,425,087 A * | 1/1984 | Gould ............... 417/414 |
| 4,453,892 A | 6/1984 | Brookbank, III |
| 4,487,299 A | 12/1984 | Bookout |
| 4,519,617 A * | 5/1985 | Butler ............... 277/550 |
| 4,583,923 A | 4/1986 | James |
| 5,367,214 A | 11/1994 | Turner, Jr. |
| 5,796,197 A | 8/1998 | Bookout |
| 6,046,521 A | 4/2000 | Heinig |
| 6,201,327 B1 | 3/2001 | Rivas |
| 6,242,829 B1 | 6/2001 | Scarsdale |
| 6,268,672 B1 | 7/2001 | Straub et al. |
| 6,648,335 B1 * | 11/2003 | Ezell ............... 277/438 |
| 6,688,860 B2 | 2/2004 | Du et al. |
| 6,851,935 B2 | 2/2005 | Merrill et al. |
| 6,863,124 B2 | 3/2005 | Araux et al. |
| 6,981,853 B2 | 1/2006 | Du et al. |
| 2004/0146415 A1* | 7/2004 | Merrill et al. ............ 417/414 |

FOREIGN PATENT DOCUMENTS

| | | |
|---|---|---|
| GB | 2085667 A | 4/1982 |
| GB | 2396974 | 7/2004 |

\* cited by examiner

*Primary Examiner*—Quyen Leung
*Assistant Examiner*—David W. Scheuermann
(74) *Attorney, Agent, or Firm*—Rodney V. Warfford; Kevin B. McGoff; Robert Van Someren (57) ABSTRACT

A technique is provided to facilitate pumping of fluids in a well. A submersible pumping system utilizes a submersible motor to power a submersible pump. A motor protector works in cooperation with the submersible motor to protect motor fluid within the submersible motor and to reduce differential pressures between the internal motor fluid and the external well fluid. The motor protector incorporates a piston slidably sealed within an interior cavity of the motor protector for movement to reduce undue differential pressures.

17 Claims, 7 Drawing Sheets

SYSTEM AND METHOD FOR PROTECTING A SUBMERSIBLE MOTOR

BACKGROUND

Well completion equipment is used in a variety of well related applications. For example, artificial lift systems are used to produce fluids, such as hydrocarbon based fluids, from subterranean reservoirs. One type of artificial lift system is an electric submersible pumping system in which a submersible motor drives a submersible pump to produce well fluid to a desired location.

The submersible motor often contains an internal motor fluid that is protected from the surrounding well fluid. Additionally, the submersible motor is exposed to substantial differential pressures between its interior and the surrounding environment during movement downhole and during operation downhole. Accordingly, a motor protector can be coupled to the submersible motor to protect the motor from deleterious wellbore fluids while balancing undue pressure differentials.

Many types of motor protectors have been designed for incorporation into electric submersible pumping systems. The motor protectors typically comprise one or more sections that enable conformation to reduce differential pressure while maintaining a barrier between the internal motor fluid and the surrounding wellbore fluid. However, each of the types of available motor protectors can be problematic due to characteristics such as high production cost, high material cost, inability to operate in high temperature environments, undue resistance to pressure balancing, susceptibility to damage caused by contaminants in the well fluid, and susceptibility to damage due to accumulation of material depositions over time.

SUMMARY

In general, the present invention provides a system and method for pumping well fluids while protecting the submersible pumping system. A motor protector is designed for deployment within a wellbore and for use with other submersible components, such as a submersible pump and a submersible motor. The motor protector comprises a housing defining any internal cavity for holding a piston. The piston can slide along the internal cavity to reduce pressure differentials between an internal motor fluid and a surrounding well fluid. The piston further comprises a unique seal system to protect the internal motor fluid and submersible motor from contaminants.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

Figure 1:
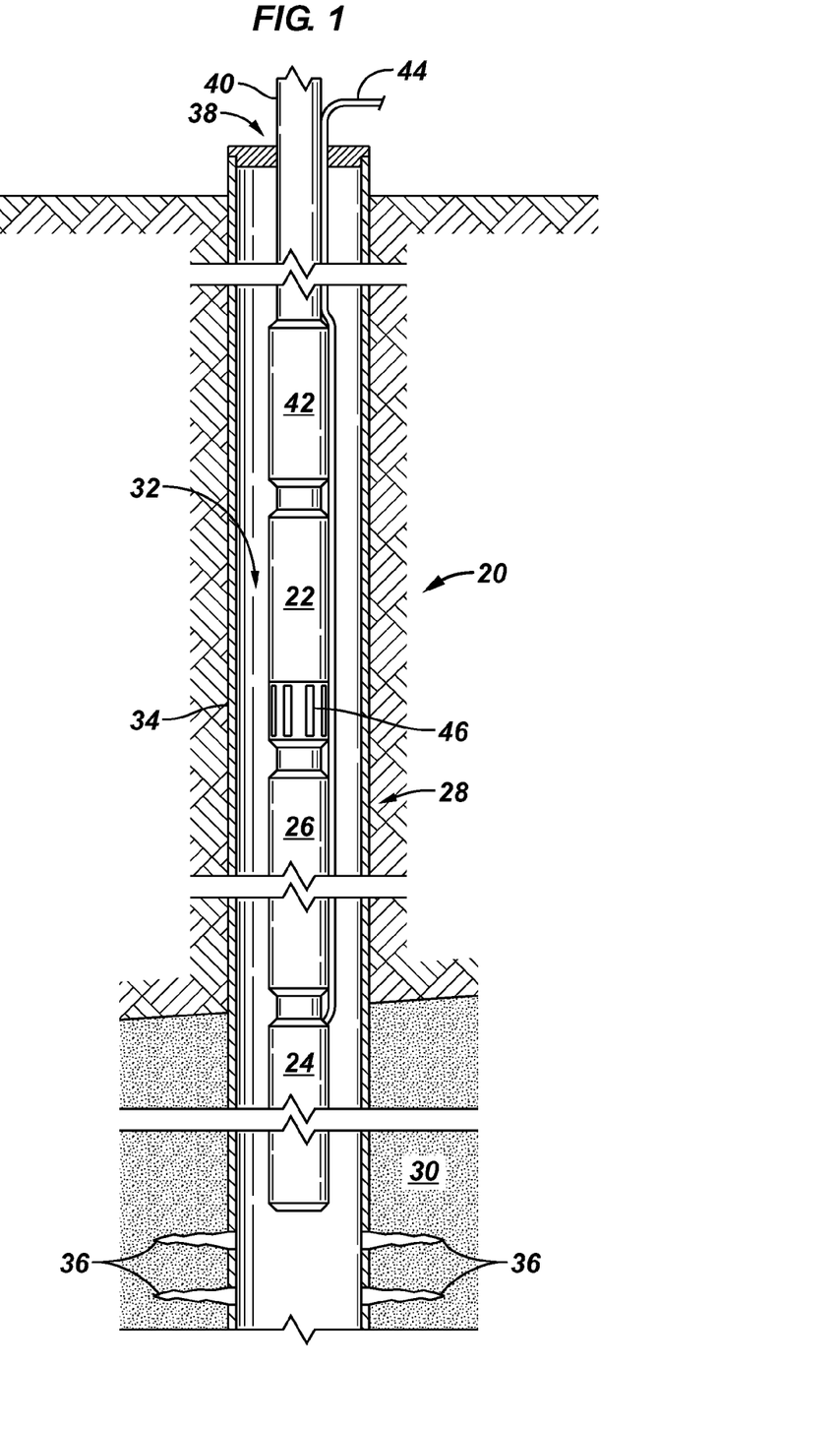
FIG. 1 is a front elevation view of an electric submersible pumping system deployed in wellbore, according to an embodiment of the present invention.

The present invention relates to well systems utilizing artificial lift equipment, such as electric submersible pumping systems for producing a well fluid. The system utilizes a motor protector design that provides a cost-effective solution for protecting submersible pumping system motors and/or other submersible components in a variety of well environments, including high temperature environments. One example of a submersible system that can be used in accordance with the present invention is illustrated in FIG. 1. However, this system is provided for purposes of explanation, and a variety of other configurations and components can be incorporated for use in well applications without departing from the scope of the present invention.

Referring generally to FIG. 1, a submersible pumping system 20 is illustrated in the form of an electric submersible pumping system. Pumping system 20 comprises a submersible pump 22, a submersible motor 24 and a motor protector 26. In the example provided, pumping system 20 is designed for deployment in a well 28 within a geological formation 30 containing desirable production fluids, such as petroleum. In a typical application, a wellbore 32 is drilled and lined with a wellbore casing 34. Wellbore casing 34 may include a plurality of openings 36, e.g. perforations, through which production fluids flow into wellbore 32.

Pumping system 20 is deployed in wellbore 32 by a deployment system 38 that also may have a variety of forms and configurations. For example, deployment system 38 may comprise tubing 40 connected to submersible pump 22 by a connector 42. Power is provided to submersible motor 24 via a power cable 44. Submersible motor 24, in turn, powers the submersible pump 22 which draws production fluid in through a pump intake 46 and pumps the production fluid to a collection location via, for example, tubing 40. In other configurations, the production fluid may be produced through the annulus formed between deployment system 38 and wellbore casing 34. Motor protector 26 enables the reduction of differential pressure between well fluids in wellbore 32 and internal motor fluid within submersible motor 24 and motor protector 26. The motor protector 26 also protects the internal motor fluid from exposure to deleterious elements of the surrounding wellbore fluid. Motor protector 26 is illustrated above submersible motor 24, however the motor protector also can be designed for positioning in whole or in part below submersible motor 24.

Figure 2:
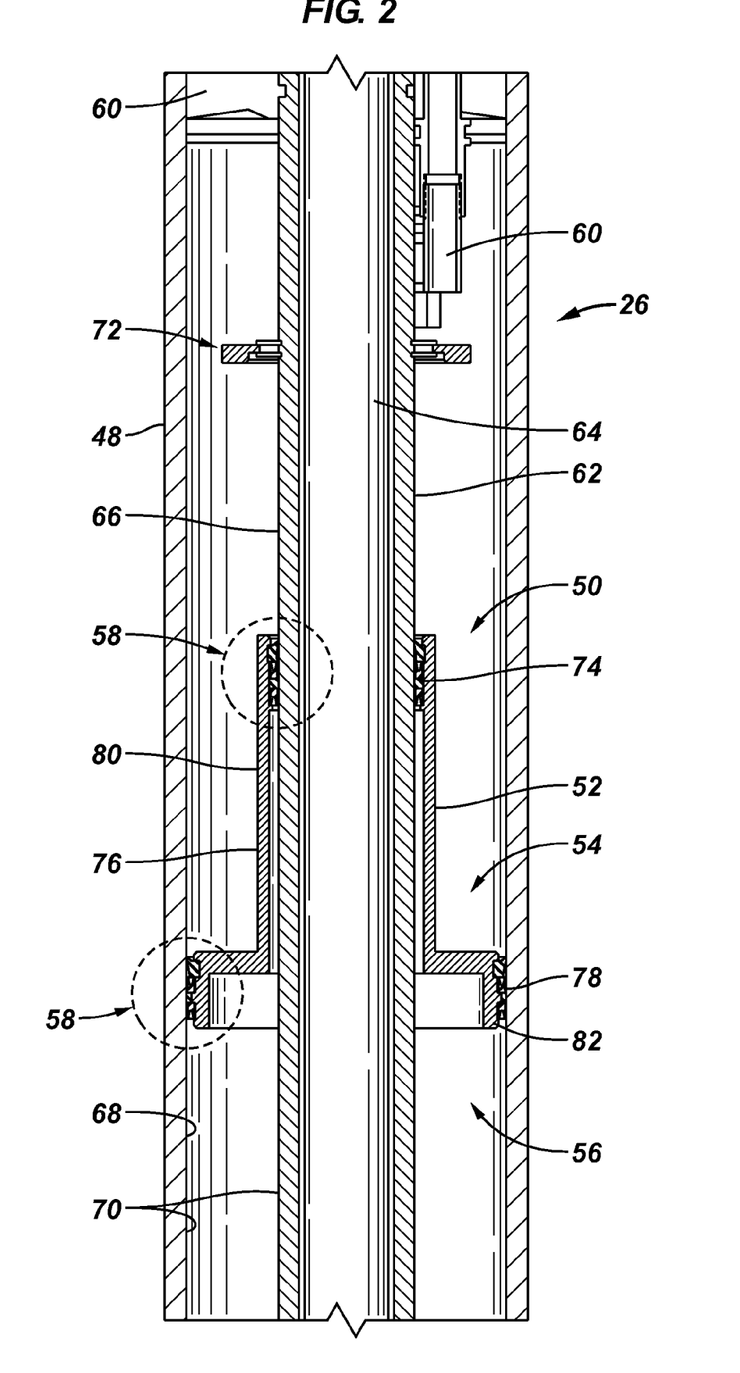
FIG. 2 is a cross-sectional view of a portion of a motor protector that can be used with the electric submersible pumping system illustrated in FIG. 1, according to an embodiment of the present invention.

In FIG. 2, an embodiment of motor protector 26 is illustrated as having an outer housing 48 defining an internal cavity 50. A piston 52 is slidably mounted in internal cavity 50 for movement when exposed to a sufficient differential pressure between a well fluid side 54 and an internal motor fluid side 56. Piston 52 serves as a barrier between the well fluid side 54 and the internal motor fluid side 56. A seal system 58 can be used to provide a seal between well fluid side 54 and internal motor fluid side 56 and to enable tilting of the piston 52 during installation and use of motor protector 26. The seal system enables non-binding operation of the piston 52 within outer housing 48 to accommodate bending of the motor protector 26 during installation and operation without unduly limiting the functionality of the motor protector. For example, the seal system may enable non-binding tilting of the piston 52 within outer housing 48 to accommodate bending and full functionality of the motor protector in many operating conditions.

The illustrated embodiment of motor protector 26 also comprises one or more conduits or ports 60 through which the well fluid side 54 of internal cavity 50 is exposed to well fluid or at least to the pressure of the well fluid. The motor protector 26 also comprises a shaft tube 62 enclosing a shaft 64 by which power is transmitted from submersible motor 24 to submersible pump 22. Accordingly, piston 52 is designed to slide longitudinally along outer housing 48 and shaft tube 62. In this type of embodiment, piston 52 can be sealingly engaged with both an external surface 66 of shaft tube 62 and an internal surface 68 of outer housing 48. One or both of external surface 66 and internal surface 68 can be coated or treated to form a low friction surface 70 that enables low friction sliding of the piston while facilitating the shedding of any well fluid deposition on surfaces 66 and 68. An example of a suitable surface treatment is a polytetrafluoroethylene (PTFE)-filled electroless nickel plating or chrome plating. One or more piston stops 72 can be mounted along internal cavity 50 to limit the sliding motion of piston 52.

In the embodiment of FIG. 2, seal system 58 comprises a seal 74 disposed between external surface 66 of shaft tube 62 and a piston body 76 of piston 52. The seal system 58 further comprises a seal 78 disposed between piston body 76 and internal surface 68 of outer housing 48. In this type of embodiment, piston 52 can be designed as a bell-shaped piston in which piston body 76 comprises a reduced diameter body section 80 extending along the shaft tube 62 and an expanded diameter body section 82 extending radially outward into cooperation with outer housing 48. The bell-shaped piston design facilitates tilting of the piston to compensate for minor misalignment between the shaft tube 62 and the housing 48 that can arise during manufacture or operation. This ability of the piston 52 to tilt prevents the development of jamming and/or high pressure differentials. It should be noted, however, that piston 52 can have other configurations. If, for example, motor protector 26 is placed below submersible motor 24, the shaft tube 62 can be eliminated and the piston 52 can be designed to span across the entire diameter of internal cavity 50.

Figure 3:
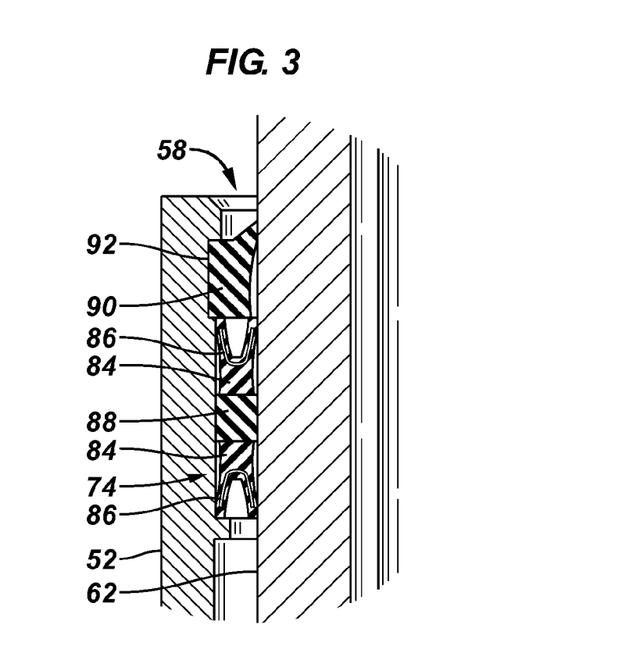
FIG. 3 is an illustration of a piston seal for use with a motor protector, according to an embodiment of the present invention.
Figure 4:
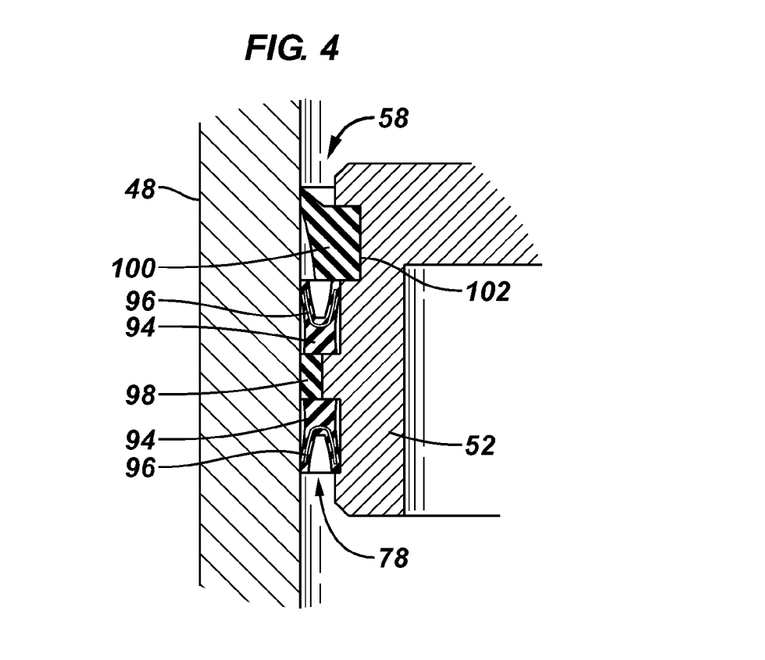
FIG. 4 is an illustration of another piston seal for use with a motor protector, according to an embodiment of the present invention.

Referring generally to FIGS. 3 and 4, embodiments of suitable seals 74 and 78 are illustrated. Referring first to FIG. 3, internal seal 74 comprises a seal set having one or more spring-loaded seals 84 formed, for example, at least partially of a polymer material. As illustrated, seals 84 may comprise a pair of back-to-back lip seals that are energized by biasing elements 86, e.g. spring members, which can be molded inside of the polymer seal material or formed as an elastomer element installed inside or outside of the polymer seal material. In this example, internal seal 74 further comprises a centralizer 88 and a scraper 90, with the centralizer 88 being disposed between the spring-loaded seals 84. It should be noted, however, that other embodiments also utilize seals that are energized by deformation of a biasing element, but the biasing element acts in conjunction with a seal other than a lip seal. Furthermore, in other embodiments, centralizer 88 can be formed as a single unit with the seals, e.g. seals 84.

When piston 52 moves along shaft tube 62, scraper 90 removes any well fluid deposition that forms on shaft tube 62 to protect seals 84 from damage and to prevent jamming of piston 52. The scraper 90 can be designed to fit tightly against external surface 66 of the shaft tube 62 while floating in a groove 92 formed in piston 52 so that it will not cause binding due to any misalignments. Centralizer 88 serves as a spacer to keep piston 52 centralized with respect to shaft tube 62 and housing 48 and can be formed from a polymer material. Thus, the centralizer 88 is able to prevent any direct contact between piston 52, which may be formed of a metal material, and shaft tube 62, which also may be formed of a metal material. The relatively narrow construction of centralizer 88 also is designed to facilitate sliding movement of piston 52 without jamming even if slight misalignment of the shaft tube and housing occurs during installation or operation of the pumping system.

Referring now to FIG. 4, external seal 78 comprises a seal set having one or more spring-loaded seals 94 formed, for example, at least partially of a polymer material. As illustrated, seals 94 may comprise a pair of back-to-back lip seals that are energized by spring members 96 which can be molded inside of the polymer seal material or formed as an elastomer element installed inside or outside of the polymer seal material. In this example, external seal 78 further comprises a centralizer 98, disposed between spring-loaded seals 94, and a scraper member 100.

When piston 52 moves along outer housing 48, scraper 100 removes any well fluid deposition that forms on internal surface 68 of outer housing 48, thereby protecting seals 94 from damage and preventing jamming of piston 52. The scraper 100 can be designed to fit tightly against internal surface 68 of outer housing 48 while floating in a groove 102 formed in body section 82 of piston 52. With this configuration, scraper 100 will not cause binding due to any misalignments. Centralizer 98 also serves as a spacer to keep piston 52 centralized with respect to shaft tube 62 and housing 48 and can be formed from a polymer material. Thus, the centralizer 98 is able to prevent any direct contact between piston 52 and outer housing 48, which may be formed of a metal material. The relatively narrow construction of centralizer 98 also is designed to facilitate sliding movement of piston 52 without jamming even if slight misalignment of the shaft tube and housing occurs during installation or operation of the pumping system.

Figure 5:
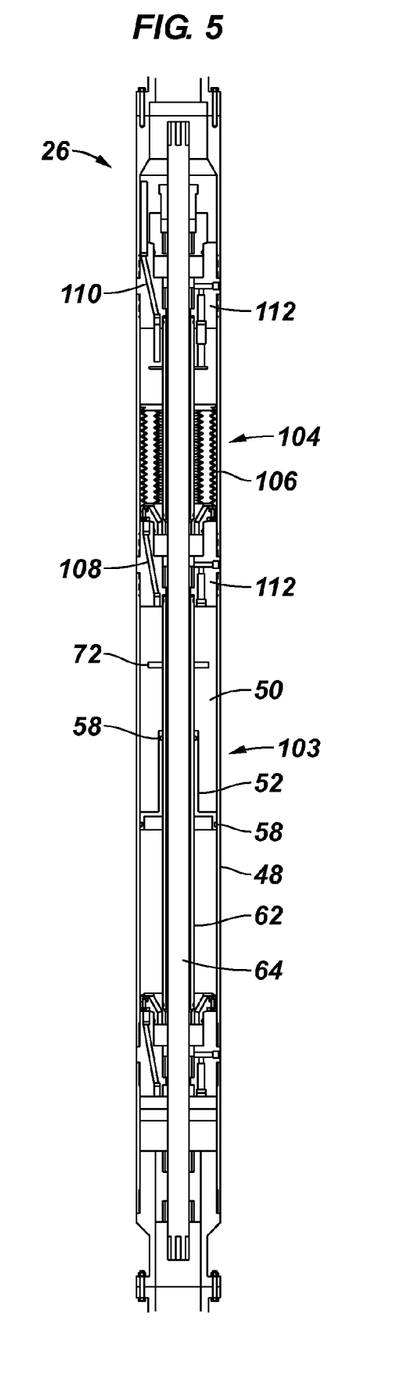
FIG. 5 is a cross-sectional view taken generally along an axis of a motor protector, illustrating an embodiment of the present invention.

Another embodiment of motor protector 26 is illustrated in FIG. 5. In this embodiment, the motor protector comprises a piston section 103 in combination with a bellows section 104 to form a hybrid motor protector. The piston section 103 contains one or more pistons 52. The bellows section 104 may be installed above or below the piston section and above or below submersible motor 24. Bellows section 104 comprises a bellows member 106 that may be in the form of, for example, a single bellows or a plurality of bellows. According to one embodiment, bellows member 106 may comprise an annular bellows member with a small bellows inside a larger bellows. The bellows member 106 can be formed from a variety of suitable materials, including metal.

In the example illustrated, bellows member 106 is a small metal bellows designed to compensate for pressure differentials relatively smaller than the pressure differentials compensated by piston 52. For example, the system can be designed such that bellows section 104 functions to compensate for the small but frequent temperature variations that create changes in internal motor fluid volume. The piston section, via movement of piston 52, functions primarily to compensate for larger temperature variations. Because the contraction and extension of the bellows member 106 requires a smaller pressure differential, this hybrid configuration helps maintain greater stability with respect to the internal pressure and a better balance between the internal pressure and the external well pressure.

Communication of pressure between bellows section 104 and piston section 103 can be achieved by appropriate conduits 108 connecting the two sections. Additionally, wellbore fluid communication conduits 110 can be used to communicate wellbore pressure to one or both of the bellows section 104 and piston section 103. Other conduits, such as conduits 112, can be used to provide a path for pressure relief or for communicating pressure from other regions of the motor protector system.

Figure 6:
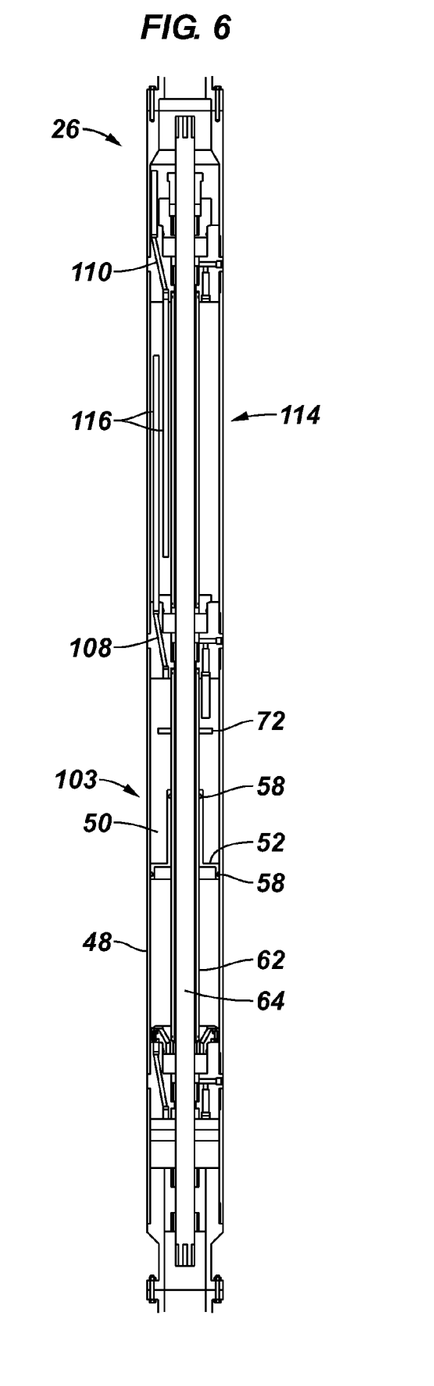
FIG. 6 is a cross-sectional view taken generally along an axis of a motor protector, illustrating another embodiment of the present invention.

Referring to FIG. 6, another embodiment of motor protector 26 is illustrated. In this embodiment, piston section 103 operates in conjunction with a labyrinth section 114 having an internal labyrinth assembly 116. Labyrinth section 114 can be configured and utilized in a variety of ways. For example, the labyrinth section 114 can be combined in series or in parallel with other protector sections, such as bellows section 104, to optimize performance of the motor protector in a variety of well conditions. The labyrinth section 114 works well, for example, in helping to provide further protection to piston 52 by facilitating the settling out of solids from the well fluid. The removal of solids also can be aided by placing a filter 118 in a flow path of the well fluid. In the embodiment illustrated, for example, the filter 118 is located in the well fluid flow path along one of the well fluid conduits 110. However, the filter 118 can be located in a variety of locations and positions that will help remove solids from the well fluid before those solids can migrate to undesirable sections of the motor protector 26. Filter 118 is useful not only in conjunction with labyrinth section 114, but it also can be used in conjunction with a variety of other motor protector sections, including bellows section 104 or piston section 103.

Figure 7:
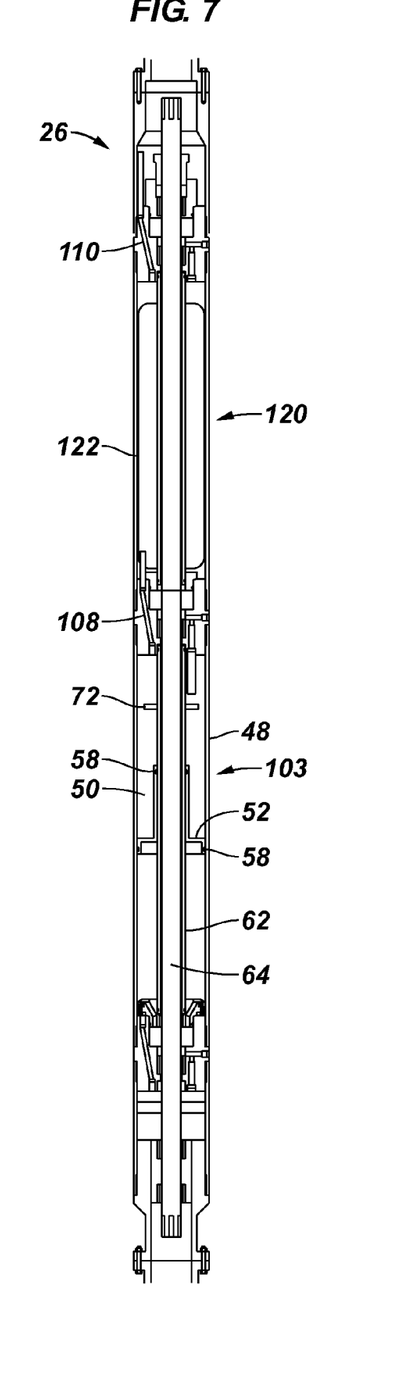
FIG. 7 is a cross-sectional view taken generally along an axis of a motor protector, illustrating another embodiment of the present invention.

Another embodiment of the motor protector 26 is illustrated in FIG. 7. In this embodiment, piston 52 is used in combination with a bag section 120 having an internal, expandable bag 122. The addition of bag section 120 can be beneficial in a variety of well environments, including corrosive environments and environments prone to produce scale and/or solids. As with labyrinth section 114, bag section 120 can be deployed in a variety of configurations and in combination with a variety of other sections in addition to the piston section 103.

Figure 8:
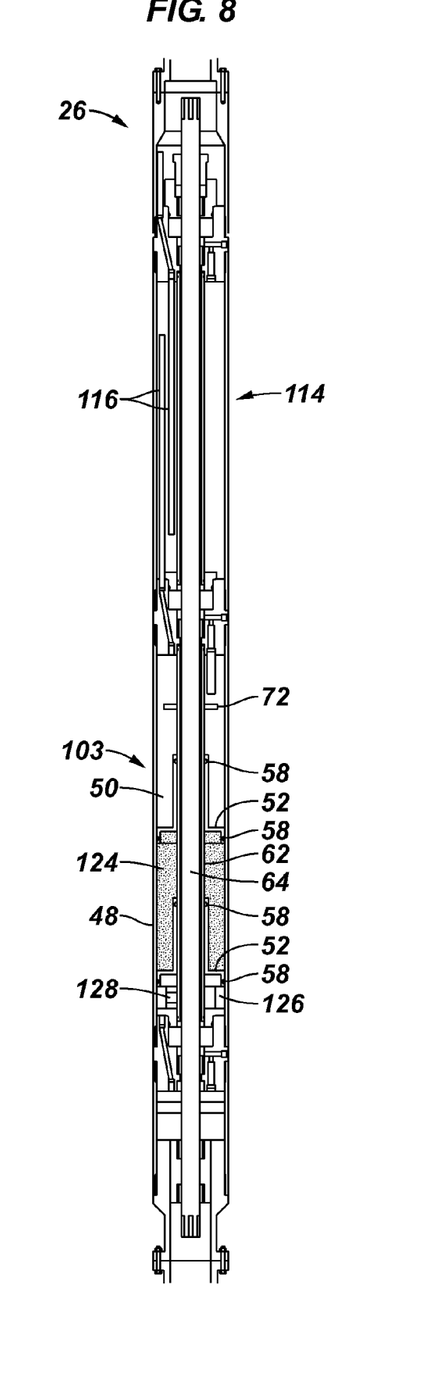
FIG. 8 is a cross-sectional view taken generally along an axis of a motor protector, illustrating another embodiment of the present invention.

Motor protector 26 also can benefit from the use of a plurality of pistons, as illustrated in FIG. 8. In this embodiment, two pistons 52 are illustrated, however additional pistons also can be added. The plurality of pistons 52 provides an additional buffer against leakage. A barrier fluid 124 can be located between pistons 52 to prevent any well fluid seeping past a first piston from reaching the subsequent piston or pistons. An example of a suitable barrier fluid and 124 is a high-density immiscible barrier fluid, such as a perfluoropolyether (PFPE) oil. In the embodiment illustrated, the plurality of pistons 52 is combined with a cooperating protector section, such as a labyrinth section, however the plurality of pistons can be used alone or in combination with a variety of cooperating protector section types. In fact, whether a single piston 52 or a plurality of pistons 52 is used, the piston or pistons can be combined in series or in parallel with other cooperating protector sections, either alone or in combination. For example, the piston or pistons can be combined with individual or combinations of bellows sections, labyrinth sections, bag sections and/or filters to further protect the piston section.

In other applications utilizing either a single piston 52 or a plurality of pistons 52, an energizing mechanism 126 can be used to provide a positive pressure differential between the internal motor fluid and the external well fluid. The illustrated energizing mechanism 126 may be a passive mechanism or an active mechanism. For example, energizing mechanism 126 can passively energize the piston 52 via, for example, a mechanical spring, a gas spring, or other passive device. On the other hand, energizing mechanism 126 may be an active energizing mechanism, such as a small electric motor 128. Electric motor is positioned to act against the adjacent piston 52 via, for example, a linear actuator to bias the piston in a direction that compresses the internal motor fluid, e.g. internal motor oil, to create a positive pressure differential. In one embodiment, power can be provided to the electric motor via electrical wiring extending through the adjacent piston 52, as illustrated in FIGS. 9 and 10.

Figure 9:
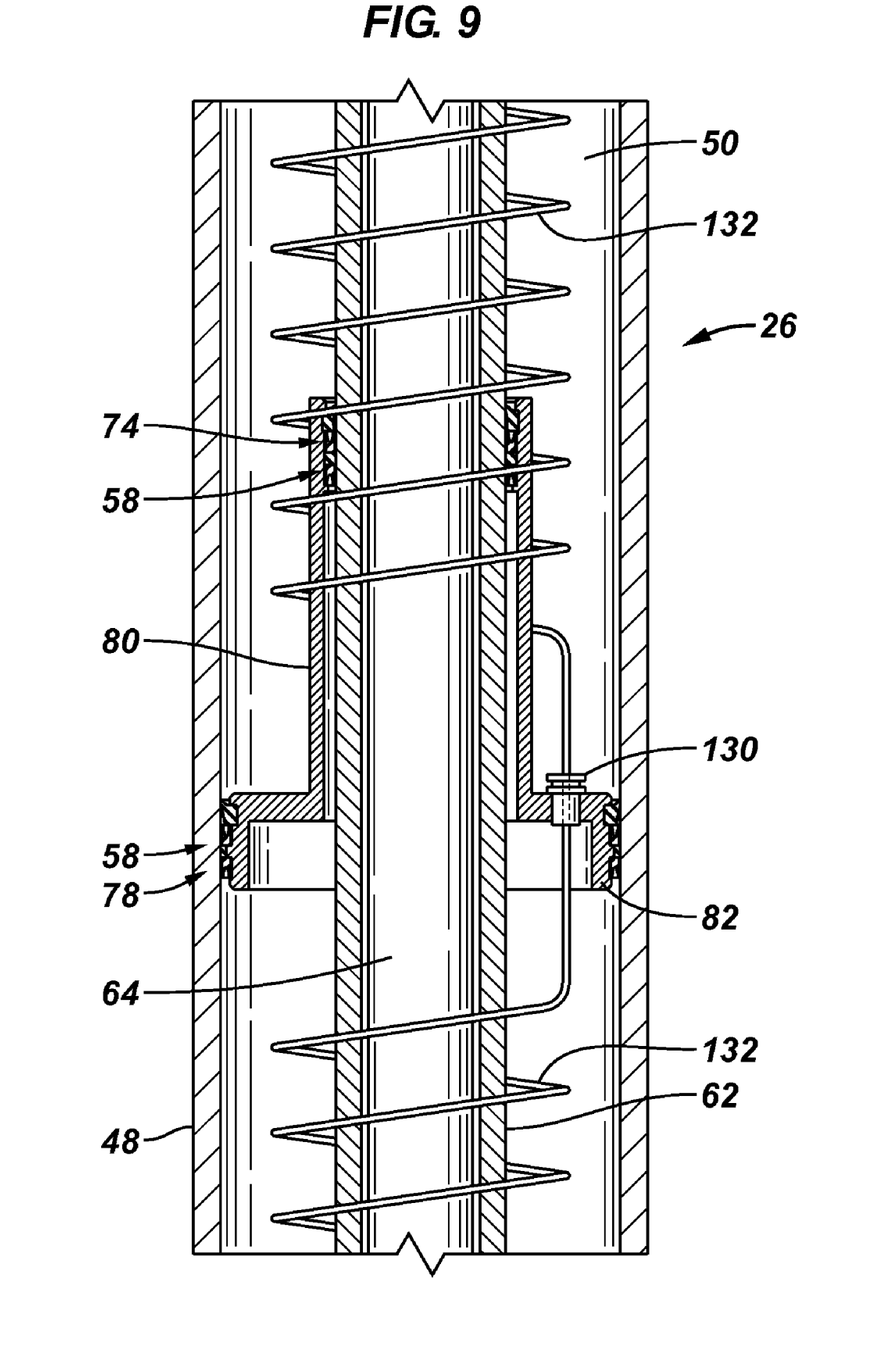
FIG. 9 is a cross-sectional view of a portion of a motor protector illustrating use of a penetrator, according to an embodiment of the present invention.
Figure 10:
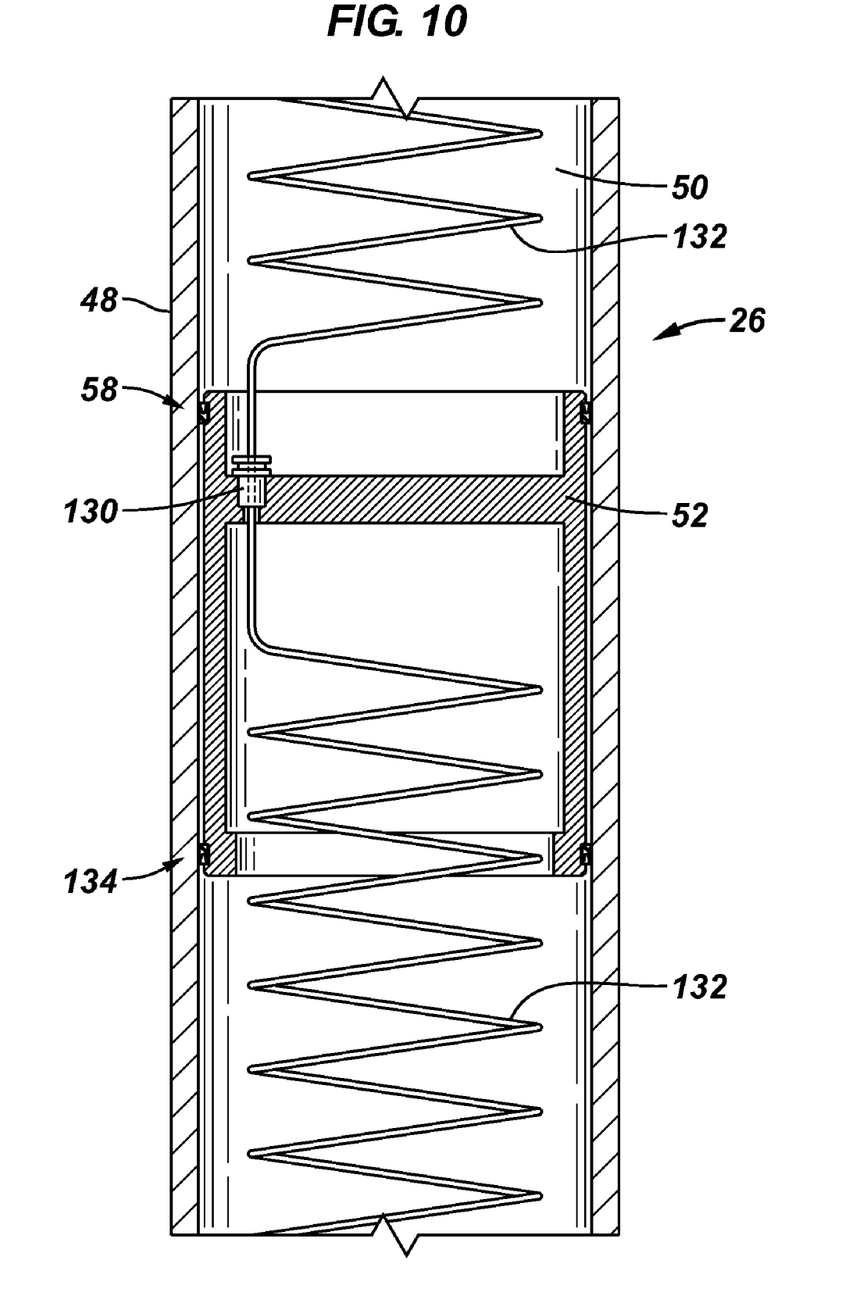
FIG. 10 is a cross-sectional view of a portion of a motor protector illustrating use of a penetrator, according to another embodiment of the present invention.

Referring generally to FIGS. 9 and 10, examples of pistons 52 with penetrators 130 are illustrated. A penetrator 130 facilitates the arrangement of communication lines 132 longitudinally through the motor protector 26. The communication line or lines 132 enable communication to or from equipment located below the motor protector 26, especially when space outside of the motor protector housing 48 is limited. The communication line or lines 132 may comprise electrical lines, hydraulic lines, fiber-optic lines or other types of communication lines, including combinations of different types of communication lines.

As illustrated in FIG. 9, one or more communication lines 132 may be routed through a bell-shaped piston, of the general type described with reference to FIG. 2. In the embodiment illustrated, the penetrator 130 is deployed in the radially expanded body section 82 of the piston 52. However, penetrator 130 also can be used to route communication lines 132 through other configurations of slidable piston 52, as illustrated in FIG. 10. In this latter embodiment, the illustrated section of motor protector 26 does not include a shaft tube, and piston 52 spans the entire internal cavity 50 defined by outer housing 48. This type of embodiment may be utilized, for example, when the motor protector 26 or a portion of the motor protector 26 is located below submersible motor 24. In the embodiment illustrated in FIG. 10, seal system 58 is provided at an upper external location along the piston, and a slide ring 134 is provided at a spaced axial distance from the seal system.

As described above, individual pistons or a plurality of pistons can be used in a variety of motor protector configurations and submersible pumping system configurations to reduce pressure differentials and/or protect internal motor fluid from contamination. The slidable piston provides a robust and economical technique for providing protection in a variety of wellbore environments. Additionally, the versatility of the design enables the motor protector piston sections to be combined with a variety of other types of motor protector sections for a given application.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A pumping system, comprising:
   a submersible pump;
   a submersible motor to power the submersible pump; and
   a motor protector in fluid communication with the submersible motor, the motor protector having an outer housing defining an internal cavity and a piston slidably mounted in the internal cavity, the piston serving as a sealed barrier separating an external well fluid from an internal motor fluid, the piston being movable upon establishment of a sufficient differential pressure between the external well fluid and the internal motor fluid, the piston further having a seal system that allows the piston to operate without binding during movement, wherein the piston further comprises a penetrator for routing a line through the piston.

2. The pumping system as recited in claim 1, wherein the motor protector comprises an internal shaft tube and the piston is mounted around the internal shaft tube, the seal system having an internal seal positioned to engage an outer surface of the shaft tube and an external seal positioned to engage an internal surface of the outer housing.

3. The pumping system as recited in claim 1, wherein the motor protector further comprises a bellows section that works in cooperation with the piston to compensate for pressure differentials between the external well fluid and the internal motor fluid.

4. The pumping system as recited in claim 3, wherein the bellows section is located below the submersible motor.

5. The pumping system as recited in claim 3, wherein the bellows section is located above the submersible motor.

6. The pumping system as recited in claim 1, wherein the motor protector further comprises an energizing mechanism to energize the piston and provide a positive pressure differential between the internal motor fluid and the external well fluid.

7. The pumping system as recited in claim 1, wherein the motor protector further comprises a labyrinth protector section.

8. The pumping system as recited in claim 1, wherein the piston is slidably mounted against a low friction surface, the low friction surface being formed by a surface treatment.

9. The pumping system as recited in claim 1, wherein the seal system comprises a radially internal seal and a radially external seal that are axially removed from each other.

10. The pumping system as recited in claim 1, wherein the seal system enables the piston to operate without binding during movement by accommodating tilting of the piston.

11. The pumping system as recited in claim 1, wherein the piston comprises at least one centralizer ring positioned to provide a narrow band of contact between the piston and the outer housing to reduce the potential for restricting piston movement.

12. The pumping system as recited in claim 1, wherein the piston comprises at least one scraper member in constant contact with an adjacent sliding surface to remove scale during movement of the piston.

13. A device for use in a wellbore, comprising:
   a motor protector having an outer housing defining an internal cavity and a piston slidably mounted in the internal cavity to separate well fluid from an internal motor fluid, the piston having a seal energized by deformation of a biasing element to facilitate movement of the piston when exposed to sufficient differential pressure while maintaining a barrier between the well fluid and the internal motor fluid, wherein the motor protector further comprises a supplemental compensation system that cooperates with the piston to create a hybrid motor protector, the supplemental compensation system further enabling adjustment for pressure changes that occur in the internal motor fluid, while separation of external well fluid and internal motor fluid is maintained, wherein the motor protector comprises a shaft tube and the seal comprises an internal seal for mounting along the shaft tube and an external seal for movement along the outer housing; and an energizing mechanism to energize the piston and provide a positive pressure differential between the internal motor fluid and the well fluid.

14. A device for use in a wellbore, comprising:
   a motor protector having an outer housing defining an internal cavity and a piston slidably mounted in the internal cavity to separate well fluid from an internal motor fluid, the piston having at least two lip seals to facilitate movement of the piston when exposed to sufficient differential pressure while maintaining a barrier between the well fluid and the internal motor fluid, wherein the motor protector further comprises a supplemental compensation system that cooperates with the piston to create a hybrid motor protector, the supplemental compensation system further enabling adjustment for pressure changes that occur in the internal motor fluid, while separation of external well fluid and internal motor fluid is maintained, wherein the motor protector comprises a shaft tube and the at least two lip seals comprise an internal spring-loaded lip seal for mounting along the shaft tube and an external spring-loaded lip seal for movement along the outer housing; and an energizing mechanism to energize the piston and provide a positive pressure differential between the internal motor fluid and the well fluid.

15. A device for use in a wellbore, comprising:
   a motor protector having an outer housing defining an internal cavity and a piston slidably mounted in the internal cavity to equalize pressure differentials between an external well fluid and an internal motor fluid, wherein the piston further comprises a penetrator for routing a line through the piston.

16. The device as recited in claim 15, wherein the cooperating protector system comprises one selected from a group consisting of: a bellows section able to balance smaller pressure differentials than the piston, a labyrinth protector section to protect the piston from solids in the external well fluid, and a bag section.

17. The device as recited in claim 15, wherein the motor protector further comprises a filter to filter solids from the external well fluid.

* * * * *